Dec. 12, 1961   F. E. BACHMAN   3,012,523
PNEUMATIC SUSPENSION FOR USE ON FREIGHT CAR TRUCKS
Original Filed May 17, 1955   2 Sheets-Sheet 1

Witness:
Richard W. Carpenter

INVENTOR.
Fred E. Bachman
BY
Walter L. Schlegel, Jr. Atty.

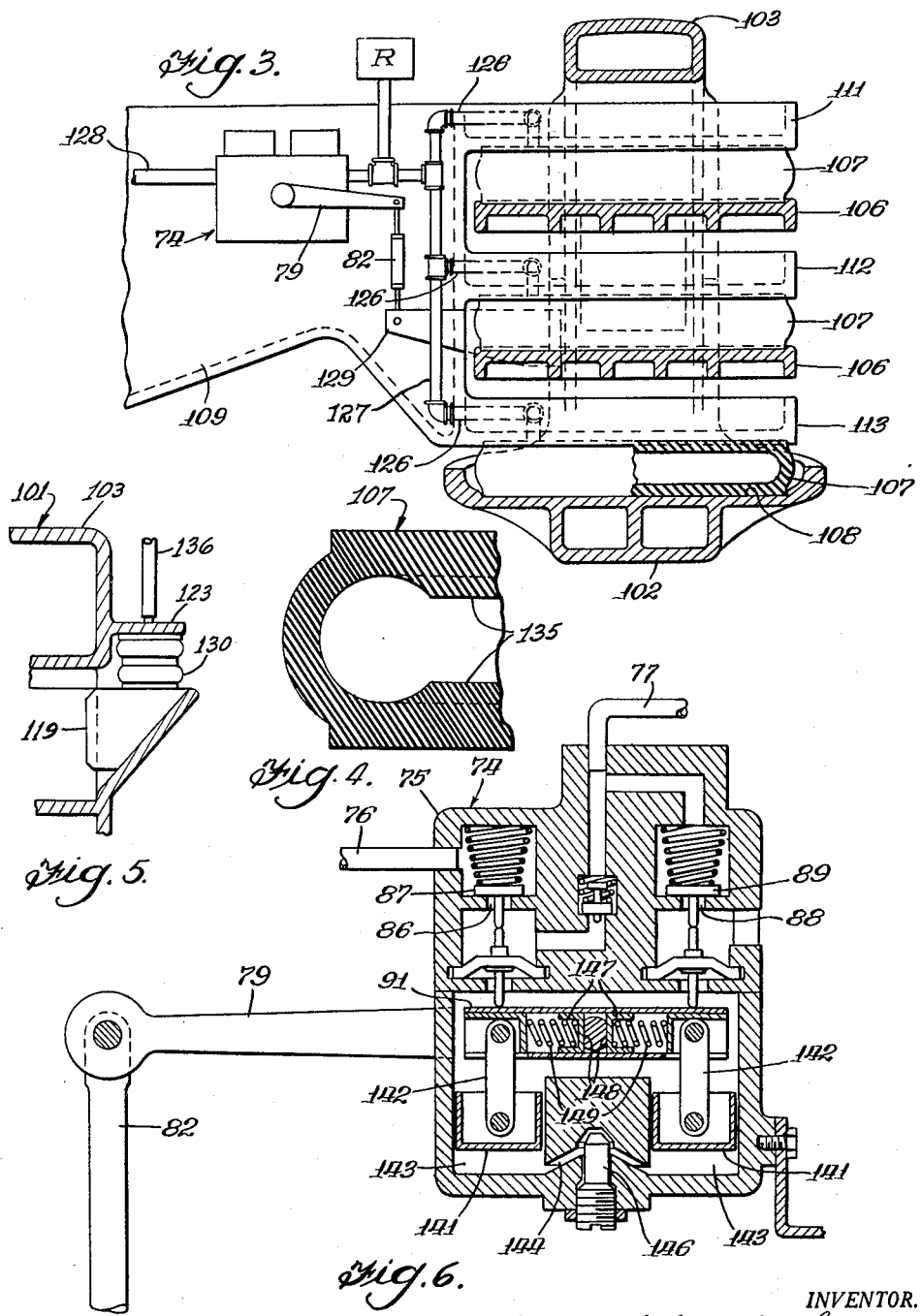

United States Patent Office 3,012,523
Patented Dec. 12, 1961

3,012,523
PNEUMATIC SUSPENSION FOR USE ON FREIGHT CAR TRUCKS
Fred E. Bachman, Granite City, Ill., assignor to American Steel Foundries, Chicago, Ill., a corporation of New Jersey
Original application May 17, 1955, Ser. No. 508,997. Divided and this application Oct. 23, 1959, Ser. No. 859,544
10 Claims. (Cl. 105—197)

This invention relates to pneumatic suspensions for use on freight car trucks, and more particularly to a pneumatic suspension arrangement which is designed to replace conventional bolster spring groups of the type seated on truck frames to resiliently support a bolster and car body.

This application is a division of my co-pending application, filed May 17, 1955, bearing Serial No. 508,997, now Patent No. 2,952,223, dated Sept. 13, 1960.

An object of the invention is to provide a pneumatic suspension system comprising a plurality of hollow inflated pads arranged on the side frames of a freight car truck to resiliently support a bolster and car body, each side frame being provided with an independent air pressure control system to regulate the air pressure within the pads associated therewith.

Another object of the invention is to provide a pneumatic suspension arrangement in which the air pressure within the pads is automatically varied and controlled to resiliently support cars in loaded, empty or partly loaded conditions.

Another object of the invention is to provide a pneumatic suspension arrangement for freight car trucks in which the pads are so formed and arranged as to require inflation under relatively low pressures in order to resiliently support a car carrying a maximum load, thereby insuring optimum riding qualities.

Another object of the invention resides in the provision of a unitary truck frame having a plurality of vertically spaced windows and ledges to receive vertically spaced platforms provided on the end of a bolster, each ledge having an inflated pad seated thereon to engage and support its related bolster platform.

The invention embodies other novel features, details of construction and arrangement of parts which are hereinafter set forth in the specification and claims and illustrated in the accompanying drawings, wherein:

FIGURE 3 is a transverse sectional view taken along the line 3—3 of FIGURE 1;

FIGURE 4 is an enlarged fragmentary detail sectional view illustrating an inflatable pad;

FIGURE 5 is a fragmentary transverse sectional view illustrating a modified form of snubber;

FIGURE 6 is a schematic sectional view illustrating the air pressure control system.

Figure 1:
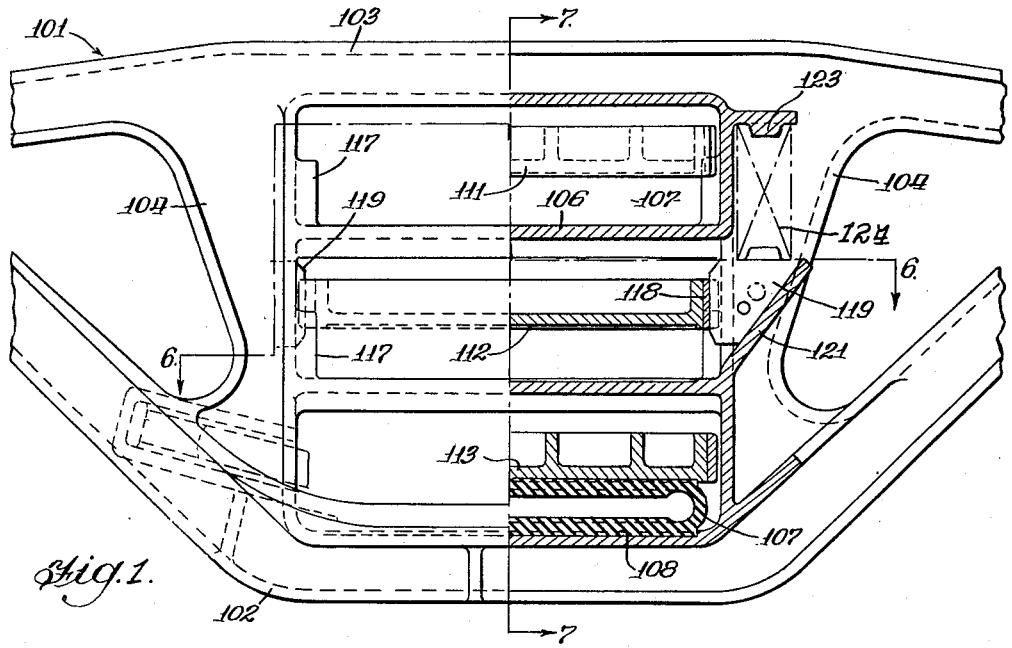
FIGURE 1 is a fragmentary side elevational view, partly in transverse vertical section, illustrating a portion of a railway car truck to which has been applied pneumatic suspension embodying features of the invention.

Referring now to the drawings for a better understanding of the invention and more particularly to FIGURES 1–5, a freight car truck embodying a pneumatic suspension arrangement is shown as comprising spaced side frames 101—101. As the side frames are identical, only a portion of one side frame has been shown. Each side frame 101 is shown in the form of a casting having a tension member 102 and compression member 103 interconnected by spaced columns 104—104, the columns being interconnected by vertically spaced seats 106 adapted to receive and support inflatable cushions 107.

The medial portion of the tension member is also formed to provide a spring seat 108 to support a cushion 107.

A bolster 109 is provided at each of its ends with a plurality of vertically spaced, horizontal ledges 111, 112 and 113 adapted to rest upon their respective cushions 107, the ledges 111 and 112 having at each side thereof spaced flanges 114—114 interconnected by a vertical wall 116. Each column 104—104 is provided with inboard and outboard flanges 117 and 117a, respectively, to receive therebetween adjacent bolster flanges 114—114.

Friction plates 118—118 are welded or otherwise secured on the vertical walls 116—116 of the ledge 112 for frictional engagement by wedge-shape snubbers 119—119, each snubber being mounted on a diagonal web 121 between side walls 122—122 provided on the side frame 101. Each column 104 is provided with a spring seat 123 to engage one end of a compression spring 124 having its other end engaging its related snubber.

Figure 2:
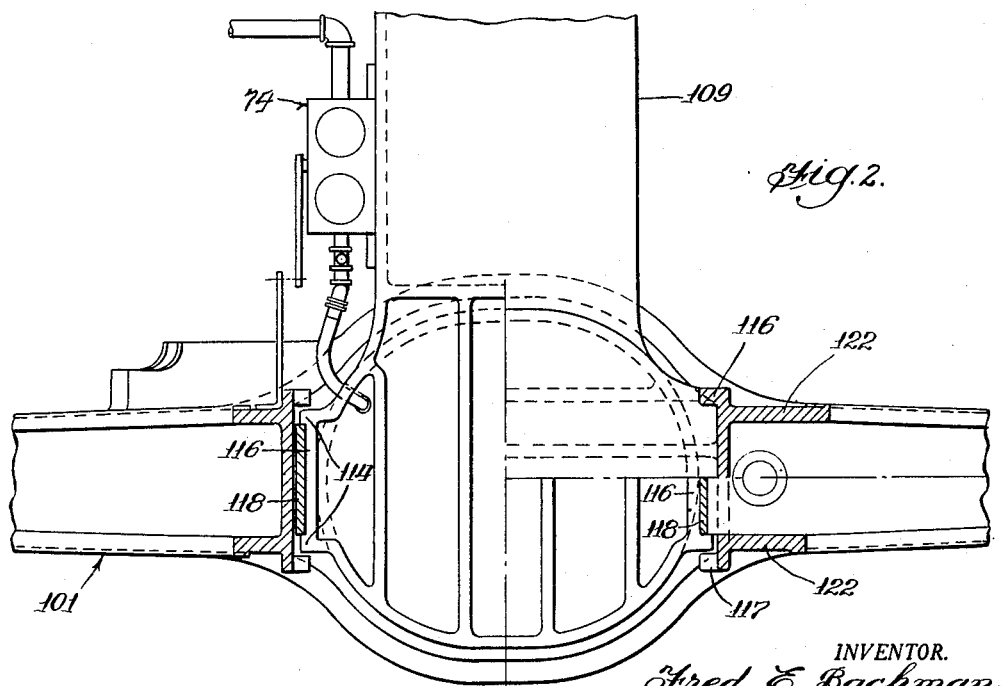
FIGURE 2 is a longitudinal sectional view taken along the line 2—2 of FIGURE 1.

The air pressure within the inflatable cushions 107 is automatically regulated responsive to variations in the weight of the car body (not shown) in loaded or unloaded conditions by means of an independent air pressure control system illustrated in FIGURES 2, 3, and 6.

As best seen in FIGURE 3, the air cushions 107 are provided with air conduits 126 connected to a manifold pipe 127 which is supplied with air under pressure from any suitable source of supply (not shown) through an air conduit 128.

A control valve 74, the details of which are described hereinafter, is interposed in the air conduit 128 and secured on the bolster 109 to regulate the flow of air into and out of the cushions 107, responsive to variations in loads applied to the bolster. Additionally, an exhaust conduit 77 is provided to connect an air reservoir R to the air conduit 128 at a location between the valve 74 and the manifold pipe 127.

The control valve 74 comprises a body 75 having journalled therein a shaft 78 keyed to a lever 79, the outer end of which is connected by means of a turnbuckle 82 to an arm 129 secured to the side frame 101. Thus, it will be seen that relative movement between the side frame 101 and the bolster 109 will serve to rotate the shaft 78.

As best seen in FIGURE 6, the valve body 75 is formed with an inlet port 86 normally closed by a closure member 87 and an exhaust port 88 normally closed by a closure member 89, said closure members being moved to open their respective ports by means of a follower 91 actuated by the shaft 78.

A car body (not shown) is adapted to be supported upon and connected to the bolster 109 in any conventional manner. During loading of the car body with freight, the bolster 109 is urged downwardly toward each side frame 101 thereby causing the outer end of valve lever 79 to pivot upwardly and thereby act through the shaft 78 and follower 91 to move the inlet closure member 87 to open position to thereby permit air under pressure to pass through the valve into the cushions 107 and to increase the air pressure therein until the bolster has been moved upwardly a predetermined distance above the side frames, at which time the inlet port 86 is closed by the closure member 87.

During unloading of the freight car, the bolster 109 is urged upwardly away from the side frames by the cushions 107, thereby causing the outer end of valve lever 79 to pivot downwardly to move the exhaust closure member 89 to open position and thus permit some of the air in the inflated cushion to escape through conduit 77 to the air reservoir R. It will thus be seen that relative vertical movement between the bolster and the side frames responsive to loading or unloading of the freight car is automatically controlled by means effective to vary the air pressure within the cushions 107 so as to thereby maintain at all times a predetermined spacing between the side frame and the bolster.

As illustrated in FIGURE 4, the cushions 107 may be formed with opposed bosses 135 for abutting engagement in the event the air pressure in the cushions should, for any reason, fail to support the load thereon.

FIGURE 5 illustrates another modified form of the invention in which an inflatable air cushion 130 is interposed between the snubber 119 and the spring seat 123, the cushion being supplied with air under pressure through a conduit 136 connected (not shown) to the manifold pipe 127.

To prevent opening and closing of the valve members 87 and 89 during normal relative movement between the bolster and side frames as the truck moves over irregular track, the valve 74 is provided with a hydraulic dampening device comprising hydraulic pistons 141—141 connected to opposite ends of the follower 91 by links 142—142 for movement within cylinders 143—143 to force fluid through a connecting passageway 144 having a needle valve 146 therein. The follower 91 is also provided with follower pistons 147—147 normally urged into engagement against diametrically opposed flat surfaces 148—148 on the shaft 78 by springs 149—149, whereby the shaft may be rapidly rotated without causing rotation of the follower 91 as the truck passes over irregular track. If, however, the shaft 78 is rotated slowly due to loading or unloading of the car, the springs 149—149 react between their pistons 147—147 and the follower to cause the latter to rotate with the shaft and thus open one of the valve members 87 or 89.

The valve's function is to maintain the correct riding clearance between bolster and side frame. As the load increases on the bolster the cushion compresses the bolster the bolster moves down toward the side frames. As this happens, the connecting link moves the valve lever in the proper direction to admit more air to the system. The increased pressure returns the bolster to its original position. Conversely, as the load is lightened, the bolster and valve lever are moved in the opposite direction to exhaust air from the cushion and again return the bolster to its normal position with respect to the side frames by reduction in pressure.

Thus the bolster is always at a fixed position with respect to the side frames, regardless of load, and the deflection rate of the system is always directly proportional to the load. This results in constant frequencies and the same soft ride regardless of whether the bolster is fully loaded or completely free of load.

I claim:

1. In a freight car truck embodying a pneumatic suspension, a side frame, inflatable means provided on said side frame, a bolster engaging said side frame and resiliently supported at one end thereof normally entirely by said inflatable means, and means operative responsive to variations in loads supported on said bolster to vary the air pressure within said inflatable means, said side frame having a plurality of vertically spaced seats, said inflatable means including an inflatable member mounted on each of said seats, said bolster having its end formed with ledges resting upon their respective inflatable members.

2. In a freight car truck embodying a pneumatic suspension, a side frame, inflatable means provided on said side frame, a bolster engaging said side frame and resiliently supported at one end thereof normally entirely by said inflatable means, and means operative responsive to variations in loads supported on said bolster to vary the air pressure within said inflatable means, said side frame having a plurality of vertically spaced seats, said inflatable means including an inflatable member mounted on each of said seats, said bolster having its end formed with ledges resting upon their respective inflatable members, said seats extending between columns, and guide flanges on said columns to engage and guide said bolster.

3. In a freight car truck, side frame means, a bolster interconnecting the side frame means and supported thereby, said frame means having a plurality of vertically spaced seats and the bolster having a like number of vertically spaced ledges disposed above respective seats, a resilient inflatable member interposed between each of the associated seats and ledges and the support of the bolster being derived from said inflatable members and the resilience of the inflatable members being imparted to the bolster, the inflatable members being universally resilient whereby to enable relative movement between the bolster and frame means in a horizontal plane, and an air pressure control system associated with each side frame means and the inflatable members at the respective side frame means to regulate the air pressure within the inflatable members responsive to different load forces applied to the bolster.

4. The construction of claim 3 in which the control system comprises a valve, and means is included responsive to vertical movement of the bolster relative to the side frame means associated with the valve to actuate the valve and thereby regulate the air pressure as stated.

5. The construction of claim 4 in which the valve is mounted on the bolster.

6. The construction of claim 5 in which the means for operating the valve includes a link and lever arrangement interconnected between the valve and the side frame means.

7. The construction of claim 3 in which friction snubbing means is provided to dampen vertical movement of said bolster relative to said side frame means.

8. The construction of claim 7 in which pneumatic means is provided to control the operation of said snubbing means.

9. The construction of claim 8 in which the pneumatic means is controlled by the air pressure control system.

10. In a freight car truck embodying a pneumatic suspension, a pair of side frames, inflatable means provided on each of said side frames, a bolster engaging said side frames and resiliently supported at each end thereof normally entirely by said inflatable means, and means operative responsive to variations in loads supported on said bolster to vary the air pressure within each inflatable means independently of the other, each side frame having a plurality of vertically spaced seats, said inflatable means including an inflatable member mounted on each of said seats, said bolster having its end formed with ledges resting upon their respective inflatable members.

References Cited in the file of this patent

UNITED STATES PATENTS

| | | |
|---|---|---|
| 1,008,290 | Verge | Nov. 7, 1911 |
| 2,180,492 | Wilson et al. | Nov. 21, 1939 |
| 2,288,383 | Anderson | June 30, 1942 |
| 2,633,811 | Poage | Apr. 7, 1953 |
| 2,670,201 | Rossman | Feb. 23, 1954 |
| 2,691,420 | Fox et al. | Oct. 12, 1954 |
| 2,758,549 | Lich | Aug. 14, 1956 |